(12) United States Patent
Nishimura

(10) Patent No.: US 7,909,131 B2
(45) Date of Patent: Mar. 22, 2011

(54) ELECTRIC POWER STEERING APPARATUS

(75) Inventor: Akihiko Nishimura, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 226 days.

(21) Appl. No.: 12/112,420

(22) Filed: Apr. 30, 2008

(65) Prior Publication Data

US 2008/0277192 A1 Nov. 13, 2008

(30) Foreign Application Priority Data

May 7, 2007 (JP) .................................. 2007-122375

(51) Int. Cl.
*B62D 5/04* (2006.01)

(52) U.S. Cl. ...................................................... 180/446

(58) Field of Classification Search .................. 180/444, 180/446; 701/41, 42
See application file for complete search history.

(56) References Cited

U.S. PATENT DOCUMENTS

| 5,844,387 | A * | 12/1998 | Mukai et al. | 318/432 |
| 2005/0027417 | A1* | 2/2005 | Sawada et al. | 701/41 |
| 2009/0000857 | A1* | 1/2009 | Sugiyama et al. | 180/444 |

FOREIGN PATENT DOCUMENTS

| DE | 10 2005 051 442 A1 | 5/2007 |
| EP | 1 502 837 A1 | 2/2005 |
| JP | 2004-291718 | 10/2004 |
| JP | 2006-335228 | 12/2006 |

\* cited by examiner

*Primary Examiner* — Tony H. Winner
(74) *Attorney, Agent, or Firm* — Oblon, Spivak, McClelland, Maier & Neustadt, L.L.P.

(57) ABSTRACT

A microcomputer is provided with an extracting section capable of extracting a specific frequency component from an input signal. The extracting section extracts, from a pinion angle corresponding to a signal indicating the state of a steering system, a frequency component corresponding to a vibration that increases generation of a rattling noise in a speed reducing mechanism. The extracting section outputs an effective value of the extracted frequency component as a power spectrum. If the power spectrum output from the extracting section is equal to or more than a predetermined threshold value, the microcomputer outputs a motor control signal to reduce the assist force generated by the EPS actuator.

19 Claims, 9 Drawing Sheets

ELECTRIC POWER STEERING APPARATUS

This application is based on and claims priority from Japanese Patent Application No. 2007-122375 filed on May 7, 2007, the entire contents of which are incorporated herein by reference.

BACKGROUND OF THE INVENTION

The present invention relates to an electric power steering apparatus.

Conventionally, an electric power steering apparatus (EPS) provided with a motor as a driving source applies a motor torque as an assist force to a steering system by rotating a steering shaft. In general, in such an EPS, the motor is coupled to the steering shaft via a speed reducing mechanism (for example, a worm and wheel mechanism), which includes first and second gears meshed with each other. For example, according to the configuration disclosed in Japanese Laid-Open Patent Publication No. 2004-291718, rotation of the motor is reduced by the speed reducing mechanism, and is transmitted to the steering shaft.

Most EPS apparatuses include a torque sensor 93 as shown in FIG. 16. The torque sensor 93 detects a steering torque based on a torsion angle of a torsion bar 92 provided in a steering transmitting system (a steering shaft 91), which couples the steering wheel and steerable wheels. FIG. 16 shows a twin resolver type torque sensor widely employed as an EPS torque sensor. This type of a torque sensor detects a torsion angle of the torsion bar 92 by a pair of angle sensors 94a, 94b (resolvers) provided on the ends of the torsion bar 92. The EPS applies an assist force in a direction to reduce a steering reaction force based on the steering torque detected by the torque sensor.

In the above-mentioned EPS, as the motor rotates in order to reduce the steering reaction force, a rattling noise is generated at meshing parts of gears configuring the speed reducing mechanism. For example, in the case that a stress is applied to the steerable wheels such as when traveling on a rough road surface, the steering shaft is rotated by the stress. The torque sensor detects the torque based on the stress applied to the steerable wheels as the steering reaction force. At this time, the motor rotates to apply an assist force in a direction to cancel the steering reaction force. Thus, the rattling noise is generated in the speed reducing mechanism.

More specifically, as shown in FIG. 17, when a stress is applied to the steerable wheels, a first gear (reduction gear) 95, which rotates with the steering shaft, and a second gear (motor gear) 96, which is rotated by the motor, are rotated in opposite directions. As a result, teeth 95a, 96a of the gears 95, 96, which are meshed with each other, collide one another. Furthermore, the stress applied to the steerable wheels remains in the steering system as vibration. Thus, since the first and second gears 95, 96 repeatedly collide with each other while being inverted, the rattling noise is transmitted outside.

SUMMARY OF THE INVENTION

Accordingly, it is an objective of the present invention to provide an electric power steering apparatus that suppresses rattling noise from being generated by a stress applied to steerable wheels.

To achieve the foregoing objective and in accordance with one aspect of the present invention, an electric power steering apparatus applied to a steering system that transmits a steering operation of a driver to a steerable wheel is provided. The apparatus includes a steering force assist device, control means, and a speed reducing mechanism. The steering force assist device is provided with a motor as a driving source. The steering force assist device applies an assist force for assisting the steering operation to the steering system by rotating a steering shaft that couples a steering wheel operated by the driver to the steerable wheel using the motor. The control means controls actuation of the steering force assist device by feeding a driving power to the motor. The speed reducing mechanism is provided with first and second gears meshed with each other. The motor is drivingly coupled to the steering shaft via the speed reducing mechanism. The control means controls the actuation of the steering force assist device to suppress rattling noise generated in the meshed part of the first and second gears based on a frequency analysis of a vibration generated in the steering system.

DETAILED DESCRIPTION OF THE PREFERRED EMBODIMENTS

First Embodiment

A column type electric power steering apparatus (EPS) 1 according to a first embodiment of the present invention will now be described with reference to the accompanying drawings.

Figure 1:
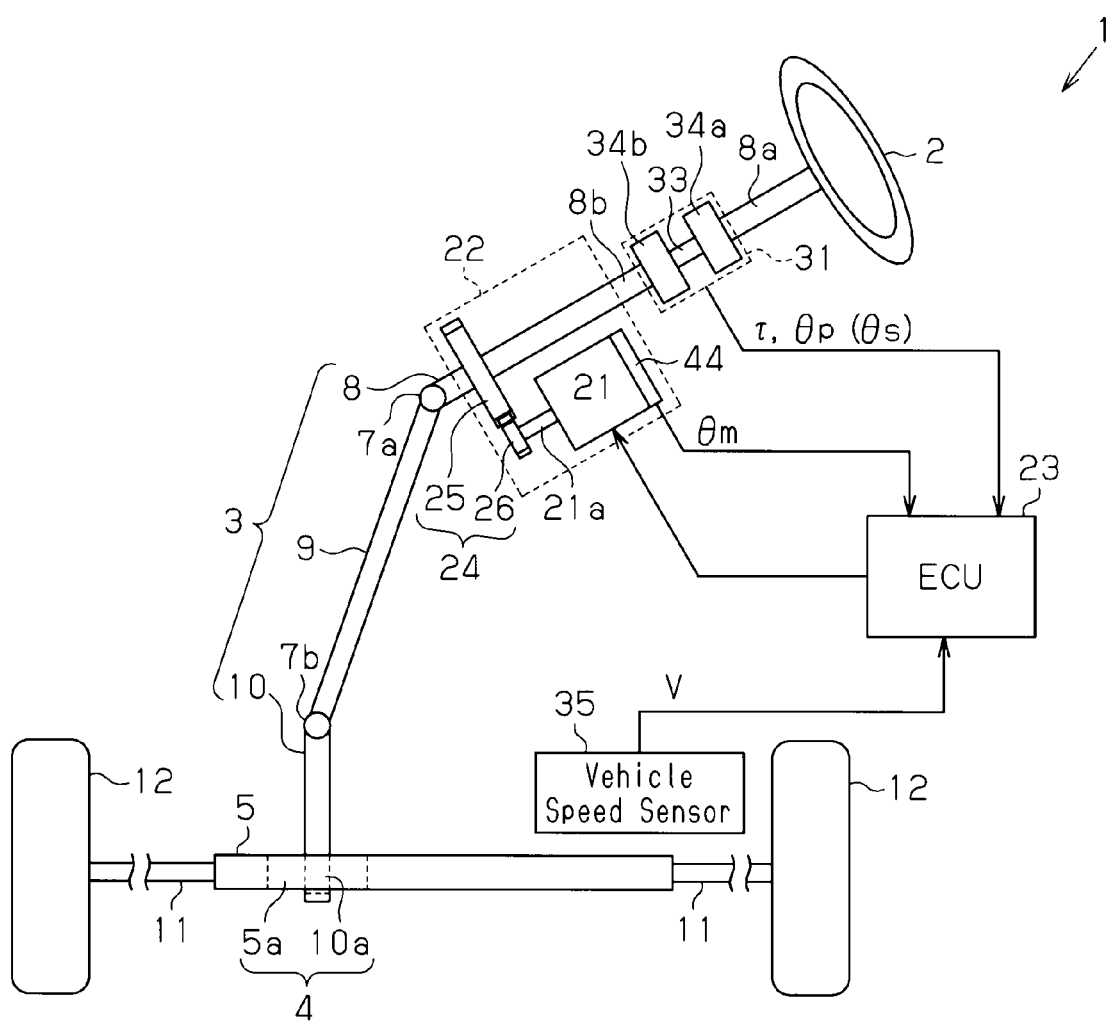
FIG. 1 is a diagrammatic view of an electric power steering apparatus (EPS)

As shown in FIG. 1, in the electric power steering apparatus (EPS) 1, a steering wheel 2 is fixed to a steering shaft 3. The steering shaft 3 is coupled to a rack shaft 5 via a rack-and-pinion mechanism 4. Rotation of the steering shaft 3 accompanying a steering operation is converted into a reciprocating linear motion of the rack shaft 5 by the rack-and-pinion mechanism 4. Specifically, the steering shaft 3 is configured by a column shaft 8, an intermediate shaft 9, and a pinion shaft 10. The column shaft 8 and the intermediate shaft 9 are coupled to each other via a universal joint 7a, and the intermediate shaft 9 and the pinion shaft 10 are coupled to each other via a universal joint 7b. The rack-and-pinion mechanism 4 is constituted by pinion teeth 10a formed at the lower end of the pinion shaft 10 and rack teeth 5a provided in the rack shaft 5 and engaging with the pinion teeth 10a. In the EPS 1, the reciprocating linear motion of the rack shaft 5 accompanying the rotation of the steering shaft 3 is transmitted to knuckles, which are not shown, via tie rods 11 coupled to both ends of the rack shaft 5. Accordingly, a steering angle of steerable wheels 12, that is, a forward moving direction of a vehicle is changed.

The EPS 1 is provided with a steering force assist device, which is an EPS actuator 22 in the first embodiment, and an ECU 23, which controls actuation of the EPS actuator 22. The EPS actuator 22 includes a motor 21 serving as a driving source. The EPS actuator 22 applies an assist force for assisting a steering operation to a steering system by rotating the steering shaft 3 using the motor.

Describing in detail, the EPS actuator 22 is a column type EPS actuator applying an assist force to the column shaft 8. The motor 21 is coupled to and drives the column shaft 8 via a speed reducing mechanism 24. The speed reducing mechanism 24 is constituted by a first gear, which is a reduction gear 25 in the first embodiment, and a second gear, which is a motor gear 26 in the first embodiment. The reduction gear 25 is provided so as to be non-rotatable relative to the column shaft 8. The motor gear 26 is provided so as to be non-rotatable relative to a motor shaft 21a. The reduction gear 25 and the motor gear 26 are meshed with each other. The speed reducing mechanism 24 employs a worm and wheel mechanism. The EPS actuator 22 transmits the rotation of the motor 21 to the column shaft 8 while reducing speed by the speed reducing mechanism 24. Accordingly, a motor torque is applied as an assist force to the steering system.

The ECU 23 serving as control means feeds a driving power to the motor 21. The ECU 23 controls the rotation of the motor 21, that is, the actuation of the EPS actuator 22 through the feeding of the driving power.

A torque sensor 31 provided in the column shaft 8 is connected to the ECU 23. The column shaft 8 is constituted by a first shaft 8a, which is close to the steering wheel 2, and a second shaft 8b, which is close to the intermediate shaft 9, and a torsion bar 33, which couples the first and second shafts 8a, 8b. The torque sensor 31 is constituted by the torsion bar 33 and a pair of angle sensors 34a, 34b (resolvers), which are provided in both ends of the torsion bar 33.

The torque sensor 31 is a twin resolver type torque sensor. The ECU 23 detects a rotation angle (a steering angle θs) of the first shaft 8a by the first angle sensor 34a and a rotation angle (a pinion angle θp) of the second shaft 8b by the second angle sensor 34b. The ECU 23 detects a steering torque τ on the basis of a difference between both the rotation angles detected by both the angle sensors 34a, 34b, that is, a torsion angle of the torsion bar 33.

A vehicle speed V detected by a vehicle speed sensor 35 is input to the ECU 23. The ECU 23 determines a target assist force to be applied to the steering system on the basis of a vehicle state quantity detected by each of the sensors. The ECU 23 then feeds a driving power to the motor 21 so as to generate the target assist force in the EPS actuator 22.

Next, a description will be given of the assist control in the EPS 1.

Figure 2:
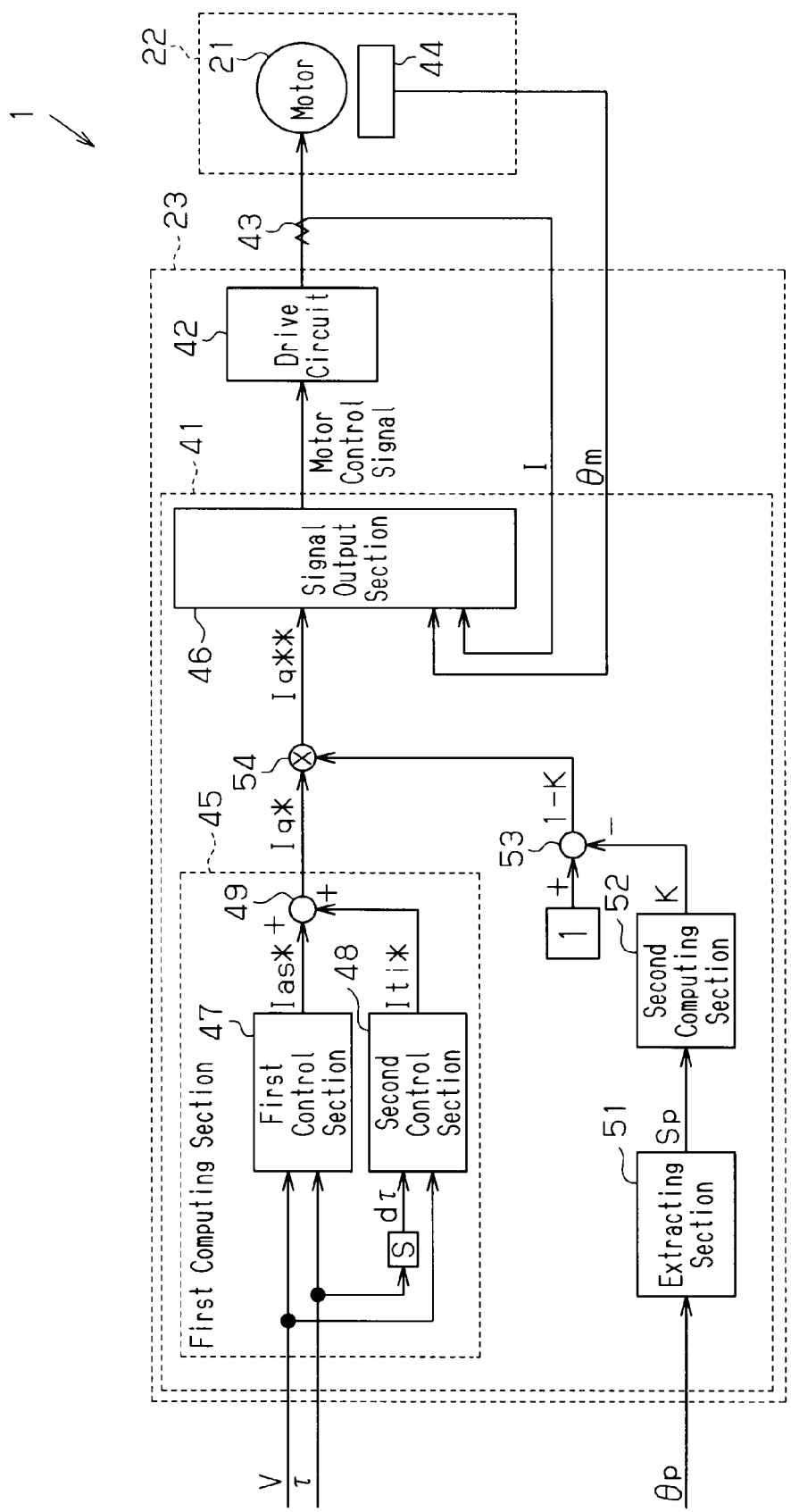
FIG. 2 is a control block diagram of an EPS in accordance with a first embodiment.

As shown in FIG. 2, the ECU 23 is provided with a microcomputer 41, which outputs a motor control signal, and a drive circuit 42, which feeds the driving power to the motor 21 on the basis of the motor control signal.

The ECU 23 is connected to a current sensor 43 for detecting an actual current value I applied to the motor 21 and a rotation angle sensor 44 (refer to FIG. 1) for detecting a motor rotation angle θm. The microcomputer 41 generates a motor control signal output to the drive circuit 42 on the basis of the vehicle state quantities, and the actual current value I and the motor rotation angle θm of the motor 21 detected on the basis of the output signals from the current sensor 43 and the rotation angle sensor 44.

The microcomputer 41 is provided with a first computing section 45 and a signal output section 46. The first computing section 45 computes a current command value Iq* corresponding to a target value of the assist force applied to the steering system, that is, a target assist force. The signal output section 46 outputs the motor control signal on the basis of the current command value Iq*(Iq) calculated by the first computing section 45**.

The first computing section 45 is provided with a first control section 47 and a second control section 48. The first control section 47 computes a basic assist control amount Ias* corresponding to a basic control component of the target assist force. The second control section 48 computes a torque inertia compensation amount Iti* based on a differential value of the steering torque τ (a steering torque differential value dτ) as a compensation component of the basic assist control amount Ias*.

The first control section 47 receives the steering torque τ and the vehicle speed V. The first control section 47 computes the basic assist control amount Ias* on the basis of the steering torque τ and the vehicle speed V. Specifically, the first control section 47 increases the value of the basic assist control amount Ias* as the steering torque τ is increased, and as the vehicle speed V is decreased.

The second control section 48 receives the vehicle speed V in addition to the steering torque differential value dτ. The second control section 48 executes a torque inertia compensation control on the basis of each of the state quantities. "Torque inertia compensation control" refers to a control for compensating an effect of the inertia of the EPS, such as the motor, the actuator, or the like. In other words, "torque inertia compensation control" is a control for suppressing "catching feeling (response lag)" at a time of "starting turning" in the steering operation, and "carried-away feeling (overshoot)" at a time of "finishing turning". The torque inertia compensation control has an effect of suppressing a vibration generated in the steering system.

Figure 3:
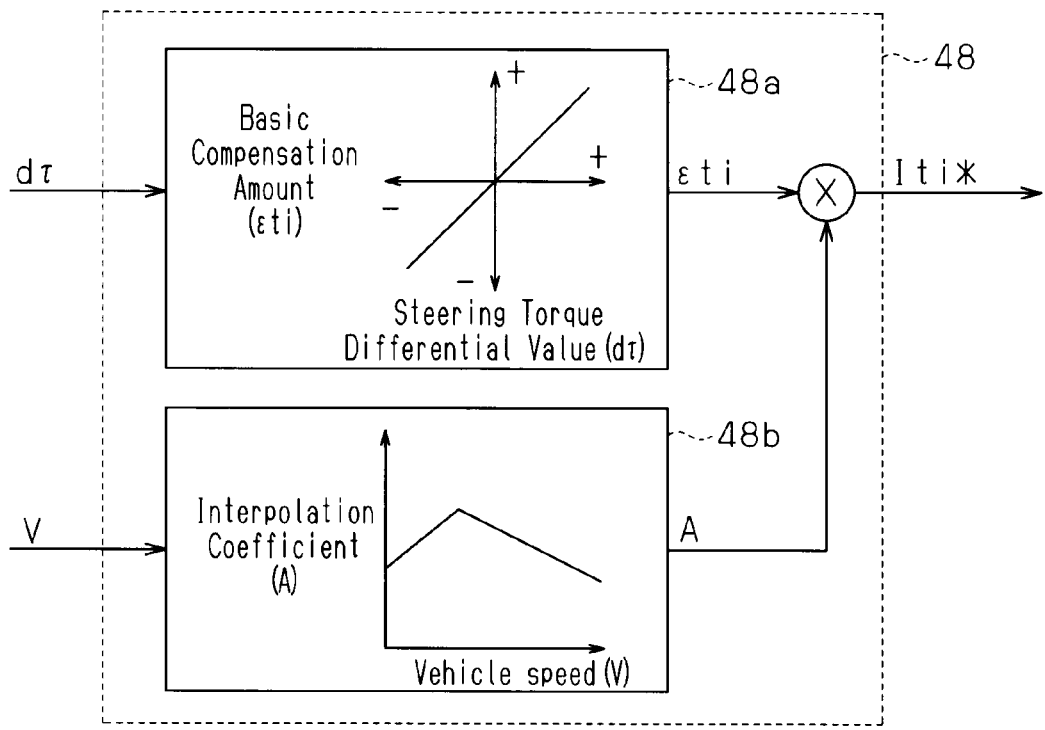
FIG. 3 is a control block diagram of a second control section.

More specifically, as shown in FIG. 3, the second control section 48 is provided with a map 48a in which a steering torque differential value dτ and a basic compensation amount εti are associated, and a map 48b in which a vehicle speed V and a interpolation coefficient A are associated. In the map 48a, the basic compensation amount εti is set as a value increasing an absolute value of the basic assist control amount Ias* in accordance with an increase in the absolute value of the input steering torque differential value dτ. In the map 48b, the interpolation coefficient A becomes greater as the vehicle speed V is increased in a low vehicle speed range, and becomes smaller as the vehicle speed is increased in a high vehicle speed range. The second control section 48 computes a torque inertia compensation amount Iti* by multiplying the basic compensation amount εti by the interpolation coefficient A, which have been determined by referring to each of the maps 48a, 48b.

As shown in FIG. 2, the basic assist control amount Ias* computed in the first control section 47 and the torque inertia compensation amount Iti* computed in the second control section 48 are input to an adder 49. The first computing section 45 computes a current command value Iq* corresponding to a target assist force by adding the torque inertia compensation amount Iti* to the basic assist control amount Ias* in the adder 49.

The current command value Iq* (Iq**) is input to the signal output section 46 together with the actual current value I detected by the current sensor 43 and the motor rotation angle θm detected by the rotation angle sensor 44. The signal output section 46 computes a motor control signal by executing a feedback control in such a manner as to make the actual current value I follow the current command value Iq* (Iq**) corresponding to the target assist force.

The motor 21 employs a brushless motor which is rotated by feeding a three-phase (U, V, W) driving power. The signal output section 46 carries out the current feedback control by converting (d/q conversion) a phase current value (Iu, Iv, Iw) of the motor 21 detected as the actual current value I into d,q-axis current values of a d/q coordinate system.

The current command value Iq* (Iq**) is input as a q-axis current command value to the signal output section 46. The signal output section 46 subjects the phase current value (Iu, Iv, Iw) to d/q conversion on the basis of the motor rotation angle θm. The signal output section 46 computes the d,q-axis voltage command value on the basis of d,q-axis current value and the q-axis current command value. The signal output section 46 computes a phase voltage command value (Vu*, Vv*, Vw*) by d/q inverse conversion of the d,q-axis voltage command value. The signal output section 46 generates a motor control signal on the basis of the phase voltage command value.

The microcomputer 41 of the ECU 23 outputs the motor control signal to the drive circuit 42. Further, the drive circuit 42 feeds the three-phase driving power based on the motor control signal to the motor 21, whereby the actuation of the EPS actuator 22 is controlled.

[Control for Suppressing Rattling Noise]

Next, a description will be given of a control for suppressing a rattling noise performed by the EPS 1.

As described above, in most of the column type (pinion type) EPS apparatuses in which a motor torque is transmitted to the steering shaft to apply an assist force to the steering system, a rattling noise is undesirably generated in the speed reducing mechanism when a stress is applied to the steerable wheels 12.

Taking this point into consideration, in the EPS 1 of the first embodiment, the ECU 23 (microcomputer 41) executes a frequency analysis of vibration generated in the steering shaft 3 configuring the steering system. Based on the result of the frequency analysis, the ECU 23 controls actuation of the EPS actuator 22 to suppress the rattling noise generated in the speed reducing mechanism 24.

More specifically, as shown in FIG. 2, the microcomputer 41 is provided with frequency extracting means, which is an extracting section 51 in the first embodiment. The extracting section 51 extracts a specific frequency component from the input signal. The extracting section 51 receives, as a signal representing the state of the steering system, the pinion angle θp representing the rotation angle of the pinion shaft 10, which configures the steering system. The extracting section 51 extracts, from the input pinion angle θp, a frequency component corresponding to the vibration generated in the steering system. More specifically, the extracting section 51 extracts a frequency component corresponding to the vibration that increases the rattling noise generated at the meshing part of the reduction gear 25 and the motor gear 26, which configure the speed reducing mechanism 24.

The extracting section 51 outputs an effective value of the extracted frequency component as a power spectrum Sp. When the power spectrum Sp from the extracting section 51 is equal to or more than a predetermined threshold value, the microcomputer 41 outputs a motor control signal to reduce the assist force applied to the steering system.

Figure 17:
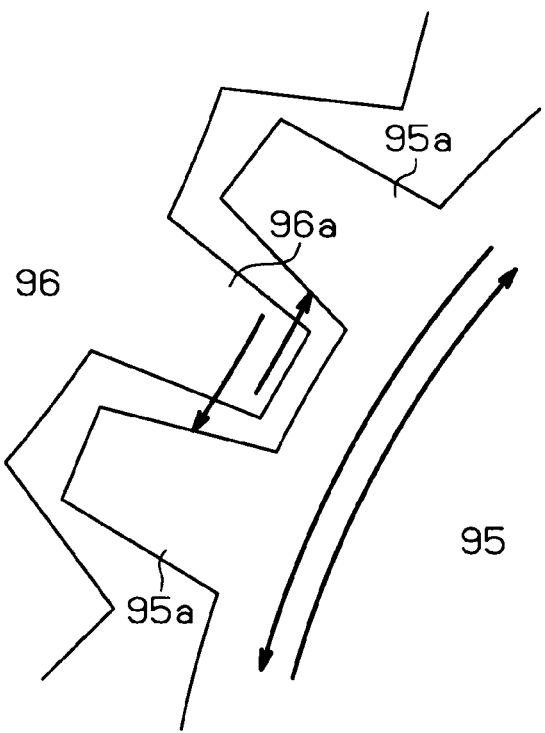
FIG. 17 is an explanatory diagram showing generation of rattling noise in a conventional speed reducing mechanism.

That is, as shown in FIG. 17, when a stress is applied to the steerable wheels 12 causing the steering shaft 3 to vibrate, the teeth of the reduction gear 25 and the teeth of the motor gear 26 are rotated in opposite directions, and repeatedly collide with each other, thereby causing a rattling noise in the speed reducing mechanism 24. When the power assisting control is executed to cancel out the vibration of the steering shaft, the relative rotation speed difference of the two gears is increased, which increases the rattling noise.

However, when the frequency component corresponding to the vibration that increases the rattling noise is significant, the assist force applied to the steering system is reduced to suppress the rotation speed of the motor gear 26. This suppresses increase in the relative rotation speed difference between the motor gear 26 and the reduction gear 25, thereby reducing the collision energy. Thus, the rattling noise generated in the speed reducing mechanism 24 is suppressed.

Figure 4:
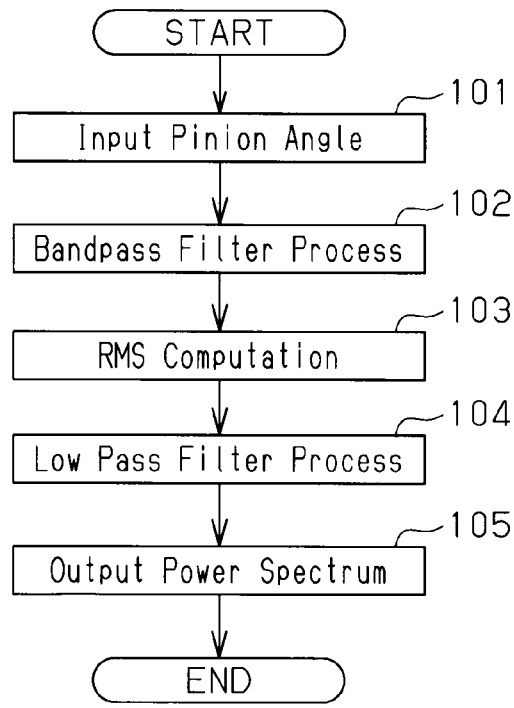
FIG. 4 is a flowchart showing a procedure for extracting a specific frequency.

More specifically, as shown in the flowchart of FIG. 4, upon receipt of the pinion angle θp (step 101), the extracting section 51 first executes a bandpass filter process, and extracts a frequency component of 8 to 12 HZ (step 102) corresponding to the vibration that increases the rattling noise. Next, the extracting section 51 determines an effective value of the frequency component extracted in step 102 on the basis of a root means square (RMS) computation (step 103). Then, the extracting section 51 executes a low pass filter process (step 104), and outputs a value after the low pass filter process as a power spectrum Sp (step 105).

As shown in FIG. 2, the microcomputer 41 is provided with a second computing section 52. The power spectrum Sp computed by the extracting section 51 is sent to the second computing section 52. The second computing section 52 computes a reduction gain K for reducing the absolute value of the current command value Iq* output from the first computing section 45. That is, the second computing section 52 computes the reduction gain K for reducing the assist force applied to the steering system.

Figure 5:
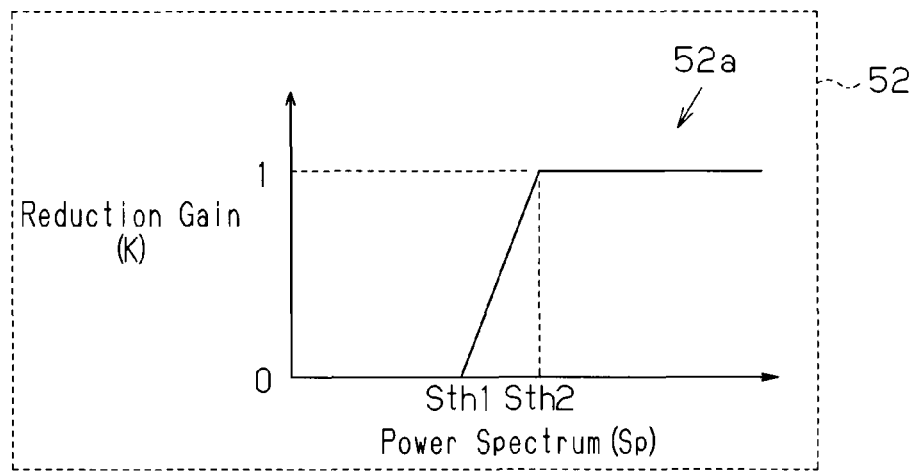
FIG. 5 is a graph showing a map in which a power spectrum and a reduction gain are associated.

As shown in FIG. 5, the second computing section 52 has a map 52a, in which the power spectrum Sp and the reduction gain K are associated. In the map 52a, in a range in which the power spectrum Sp is equal to or more than a first threshold value Sth1, the value of the reduction gain K is set such that the greater the power spectrum Sp is, the more reduced the current command value Iq* becomes. The second computing section 52 refers the input power spectrum Sp to the map 52a. Then, the second computing section 52 computes the reduction gain K such that the greater the power spectrum Sp is, the more reduced the current command value Iq* becomes.

More specifically, in the map 52a, in a range in which the power spectrum Sp is equal to or more than the first threshold value Sth1 and equal to or less than a second threshold value Sth2 (Sth1≦Sp≦Sth2), the value of the reduction gain K increases from "0" to "1" along with the increase in the power spectrum Sp. Further, in a range in which the power spectrum Sp exceeds the second threshold value Sth2, the value of the reduction gain K is "1". That is, the second computing section 52 computes the reduction gain K having a value from "0" to "1" in accordance with the value of the input power spectrum Sp. The reduction gain K computed by the second computing section 52 is input to a subtractor 53 (refer to FIG. 2). In the subtractor 53, a value "1−K" obtained by subtracting the reduction gain K from "1" is input to a multiplier 54. In the multiplier 54, the current command value Iq* is multiplied by "1−K", thereby reducing the absolute value of the current command value Iq*.

That is, when subtracting the reduction gain K having a value "0" to "1" from "1", the greater the value of the reduction gain K becomes, the smaller the subtracted value "1−K" becomes from equal to or less than "1.0". Thus, as the value of the reduction gain K is increased, the absolute value of the corrected current command value Iq that has been multiplied by "1−K" is more significantly reduced. If the reduction gain K is "1", that is, if the power spectrum Sp input to the second computing section 52 is greater than the second threshold value Sth2, the value of the corrected current command value Iq becomes "0". The signal output section 46 then outputs the motor control signal based on the corrected current command value Iq**, thereby reducing the assist force applied to the steering system.

The first embodiment has the following operations and advantages.

(1) The ECU 23 (microcomputer 41) executes a frequency analysis on the steering system, more specifically, on the vibration generated in the steering shaft 3. Based on the result of the frequency analysis, the ECU 23 controls actuation of the EPS actuator 22 to suppress the rattling noise generated in the speed reducing mechanism 24.

In accordance with the structure mentioned above, it is possible to instantaneously detect the generation of the rattling noise caused by stress applied to the steerable wheels 12, before the vibration caused by the stress becomes evident as the rattling noise, and it is possible to quickly suppress the rattling noise. As a result, it is possible to further reduce noise and improve the steering feel.

(2) The microcomputer 41 includes the extracting section 51, which extracts a specific frequency component from the input signal. The extracting section 51 extracts, from the pinion angle θp, the frequency component corresponding to the vibration that increases the rattling noise caused in the speed reducing mechanism 24, and outputs the effective value of the extracted frequency component as the power spectrum Sp. Then, if the power spectrum Sp is equal to or more than the predetermined threshold value, the microcomputer 41 outputs the motor control signal to reduce the assist force generated by the EPS actuator 22.

When the steering shaft 3 vibrates by application of a stress on the steerable wheels 12, the teeth of the reduction gear 25 and the teeth of the motor gear 26 rotate in the opposite directions from each other, and repeatedly collide with each other. This causes the rattling noise in the speed reducing mechanism 24. Executing the power assist control to cancel out the vibration of the steering shaft 3 increases the relative rotation speed difference of the two gears, which increases generation of the rattling noise.

However, when the frequency component corresponding to the vibration that increases generation of the rattling noise becomes significant, the assist force applied to the steering system is reduced to suppress the rotation speed of the motor gear 26. This suppresses increase in the relative rotation speed difference between the motor gear 26 and the reduction gear 25, thereby reducing the collision energy of the gears 25, 26. As a result, the rattling noise generated in the speed reducing mechanism 24 is effectively suppressed.

(3) The second computing section 52 computes the reduction gain K such that the greater the power spectrum Sp is, the more reduced the current command value Iq* becomes.

From the aspect of the original function of the EPS to apply an assist force, reduction of the assist force is not always desirable. In this regard, as in the above mentioned configuration, by reducing the assist force in accordance with the power spectrum Sp, which is the effective value of the frequency component corresponding to the vibration that increases generation of the rattling noise, generation of the rattling noise is effectively suppressed while appropriately applying an assist force. In addition, even if the assist force is reduced, the assist force is gently changed so that favorable steering feel is maintained.

Second Embodiment

A description will be given below of a second embodiment of the present invention with reference to the accompanying drawings.

A main difference between the present embodiment and the first embodiment lies only in the control of suppressing the rattling noise. To facilitate illustration, like or the same reference numerals are given to those components that are like or the same as the corresponding components of the first embodiment, and the explanations are omitted.

Figure 6:
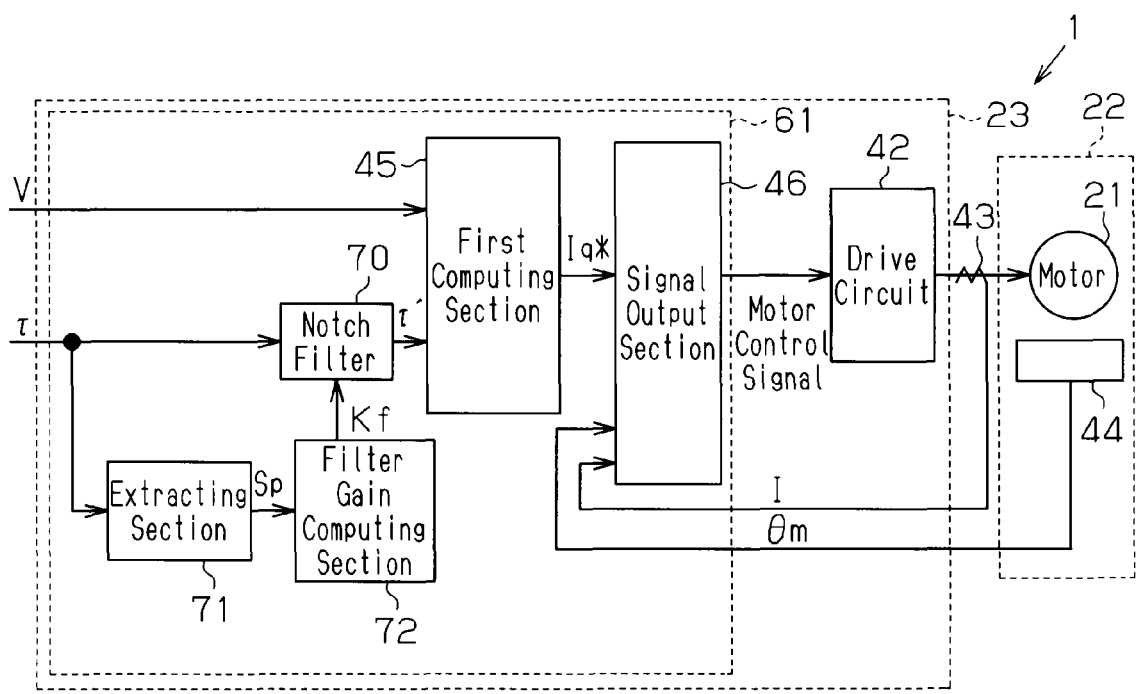
FIG. 6 is a control block diagram of an EPS in accordance with a second embodiment.

As shown in FIG. 6, a microcomputer 61 includes frequency removing means, which is a notch filter 70 in the second embodiment. The notch filter 70 removes, from an input signal, the frequency component corresponding to the vibration that increases the rattling noise generated in the speed reducing mechanism 24. The first computing section 45 of the microcomputer 61 receives a steering torque τ' that has passed through the notch filter 70.

In other words, the notch filter 70 removes, from the steering torque τ, the frequency component corresponding to the vibration that increases generation of the rattling noise. The microcomputer 61 computes the current command value Iq* based on the steering torque τ' that has passed through the notch filter 70. Thus, when a stress is applied to the steerable wheels 12, the rattling noise generated in the speed reducing mechanism 24 is suppressed.

The rattling noise is increased as the assist force is applied to cancel out the vibration of the steering shaft 3 caused by application of a stress to the steerable wheels 12. Thus, as in the above mentioned configuration, by removing, in advance, the specific frequency component from the steering torque τ, which is the basis of the power assist control, application of the assist force is suppressed to cancel out the vibration of the steering shaft 3. This suppresses the rattling noise generated in the speed reducing mechanism 24.

Further, like the first embodiment, the microcomputer 61 includes frequency extracting means, which is an extracting section 71 in the second embodiment. The extracting section 71 receives a signal representing the state of the steering system, which is the steering torque τ. The extracting section 71 extracts the frequency component corresponding to the vibration that increases generation of the rattling noise from the received steering torque τ, and outputs the effective value of the extracted frequency component as the power spectrum Sp. The procedure for the extracting section 71 to extract the specific frequency component and output the effective value of it as the power spectrum Sp is the same as the procedure carried out by the extracting section 51 of the first embodiment (refer to FIG. 4). When the power spectrum Sp output from the extracting section 71 is equal to or less than the predetermined threshold value, the microcomputer 61 reduces the effect of the notch filter 70.

More specifically, the microcomputer 61 is provided with a filter gain computing section 72, which computes a filter gain Kf. The filter gain Kf is a parameter for specifying the effect of the notch filter 70 based on the power spectrum Sp output from the extracting section 71. The notch filter 70 removes the specific frequency component included in the input signal in accordance with the filter gain Kf input from the filter gain computing section 72.

Figure 7:
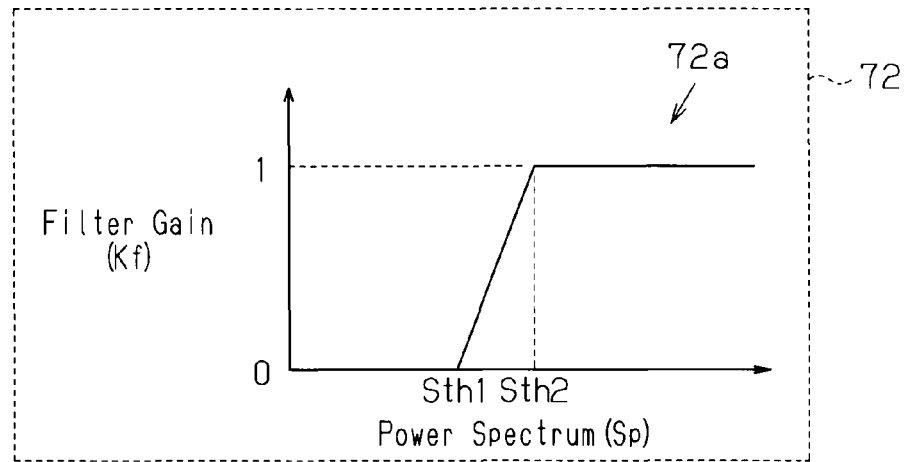
FIG. 7 is a diagrammatic view of a filter gain computing section.

As shown in FIG. 7, the filter gain computing section 72 has a map 72a in which the power spectrum Sp and the filter gain Kf are associated. In the map 72a, in a range in which the power spectrum Sp is equal to or less than the second threshold value Sth2, the value of the filter gain Kf is less than "1". In a range in which the power spectrum Sp is greater than the second threshold value Sth2, the value of the filter gain Kf is "1". In a range in which the power spectrum Sp is less than the first threshold value Sth1, the value of the filter gain Kf is "0". That is, in the map 72a, in a range in which the power spectrum Sp is equal to or less than the second threshold value Sth2, the value of the filter gain Kf is set to a value that reduces the effect of the notch filter 70. The filter gain computing section 72 computes the filter gain Kf by referring the received power spectrum Sp to the map 72a.

That is, in a range in which the value of the power spectrum Sp is equal to or less than the second threshold value Sth2, the filter gain computing section 72 computes the filter gain Kf such that the smaller the value of the power spectrum Sp is, the more reduced the effect of the notch filter 70 becomes. Based on the filter gain Kf computed in this manner, the effect of the notch filter 70 for removing the specific frequency is exerted. Accordingly, when the power spectrum Sp is equal to or less than the second threshold value Sth2, the effect of the notch filter 70 is reduced.

Excessively restricting the assist force applied to cancel out the vibration of the steering system in order to suppress generation of the rattling noise deteriorates the steering feel. Taking this point into consideration, as described above, the effect of the notch filter 70 is changed in accordance with the effective value of the frequency component corresponding to the vibration that increases the rattling noise, that is, the power spectrum Sp. In the second embodiment, by increasing the effect of the notch filter 70 in a state where the rattling noise is easily generated in the speed reducing mechanism 24, the rattling noise is effectively suppressed while maintaining favorable steering feel.

The second embodiment has the following operations and advantages.

(1) The notch filter 70 removes, from the steering torque τ, the frequency component corresponding to the vibration that increases generation of the rattling noise. The microcomputer 61 computes the current command value Iq* based on the steering torque τ' that has passed through the notch filter 70.

According to the above mentioned configuration, the frequency component corresponding to the vibration that increases generation of the rattling noise is removed from the steering torque τ in advance. In this case, application of the assist force for cancelling out the vibration of the steering shaft 3 is suppressed. This effectively suppresses the rattling noise caused by applying the assist force for cancelling out the vibration.

(2) The extracting section 71 extracts, from the steering torque τ, the frequency component corresponding to the vibration that increases generation of the rattling noise, and outputs the effective value of it as the power spectrum Sp. When the power spectrum Sp output from the extracting section 71 is equal to or less than the predetermined threshold value, the microcomputer 61 reduces the effect of the notch filter 70.

That is, excessively restricting the assist force applied for cancelling out the vibration of the steering system deteriorates the steering feel. In this respect, according to the above configuration, application of the assist force is restricted as described above only in a case where the rattling noise is easily generated in the speed reducing mechanism 24. As a result, the rattling noise is effectively suppressed while maintaining favorable steering feel.

Each of the embodiments may be modified as follows.

In each of the embodiments, the present invention is embodied in the column type EPS 1, however, may be applied to, for example, an apparatus in which a motor and a steering shaft are coupled to each other via a speed reducing mechanism including first and second gears meshed with each other, such as a pinion type EPS, which applies an assist force to a pinion shaft.

In each of the embodiments, the present invention is embodied in the EPS 1, which executes a compensation control (torque inertia compensation control) based on the differential value of the steering torque τ (steering torque differential value dτ), however, may be applied to an apparatus that does not execute such a control.

In each of the embodiments, the reduction gear 25 is the first gear, and the motor gear 26 is the second gear, however, the first and second gears may be reversed.

In each of the embodiments, the extracting section 51 (71) is provided in the microcomputer 41 (61), however, may be provided outside of the microcomputer 41 (61), or outside of the ECU 23.

As the "signal representing the state of the steering system" from which the specific frequency component is extracted, the pinion angle θp representing the rotation angle of the pinion shaft 10 is used in the first embodiment, and the steering torque τ is used in the second embodiment. However, any "signal representing the state of the steering system" including the frequency corresponding to the vibration that increases generation of the rattling noise, such as the steering angle θs (wheel angle), may be used. The pinion angle θp, the steering angle θs, the steering torque τ used for the frequency analysis are not instantaneous values, but are based on continuous signals.

Figure 8:
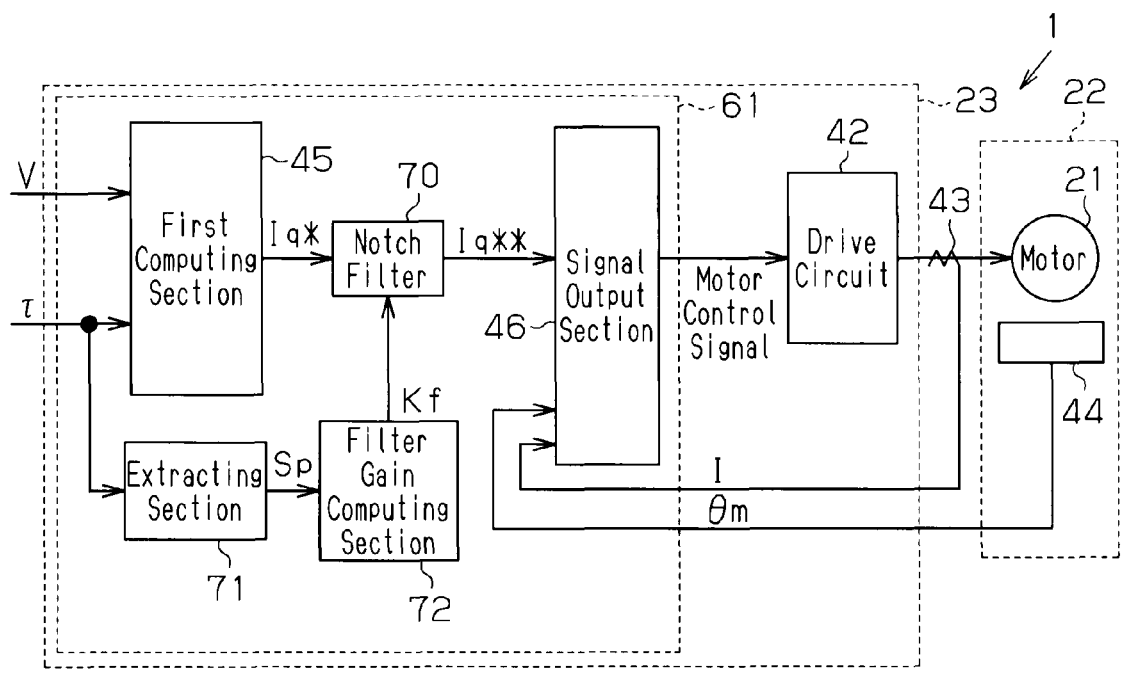
FIG. 8 is a control block diagram of an EPS in accordance with a modified embodiment.

In the second embodiment, the microcomputer 61 includes the notch filter 70, which removes, from the steering torque τ, the frequency component corresponding to the vibration that increases generation of the rattling noise. However, the microcomputer 61 may be provided with the notch filter 70 located between the first computing section 45 and the signal output section 46 as shown in FIG. 8. In this case, the notch filter 70 removes the frequency component corresponding to the vibration that increases generation of the rattling noise from the current command value Iq*. Then, the microcomputer 61 may output a motor control signal based on the current command value Iq** output from the notch filter 70. In this case, the same advantages as the second embodiment are obtained.

In the second embodiment, when the power spectrum Sp output from the extracting section 71 is equal to or less than the predetermined threshold value, the microcomputer 61 reduces the effect of the notch filter 70, but may maintain the effect of the notch filter 70.

Furthermore, the reduction of the assist force as in the first embodiment and the use of the notch filter 70 as in the second embodiment are preferably limited to a case where the vehicle speed V is in a predetermined vehicle speed range.

Figure 9:
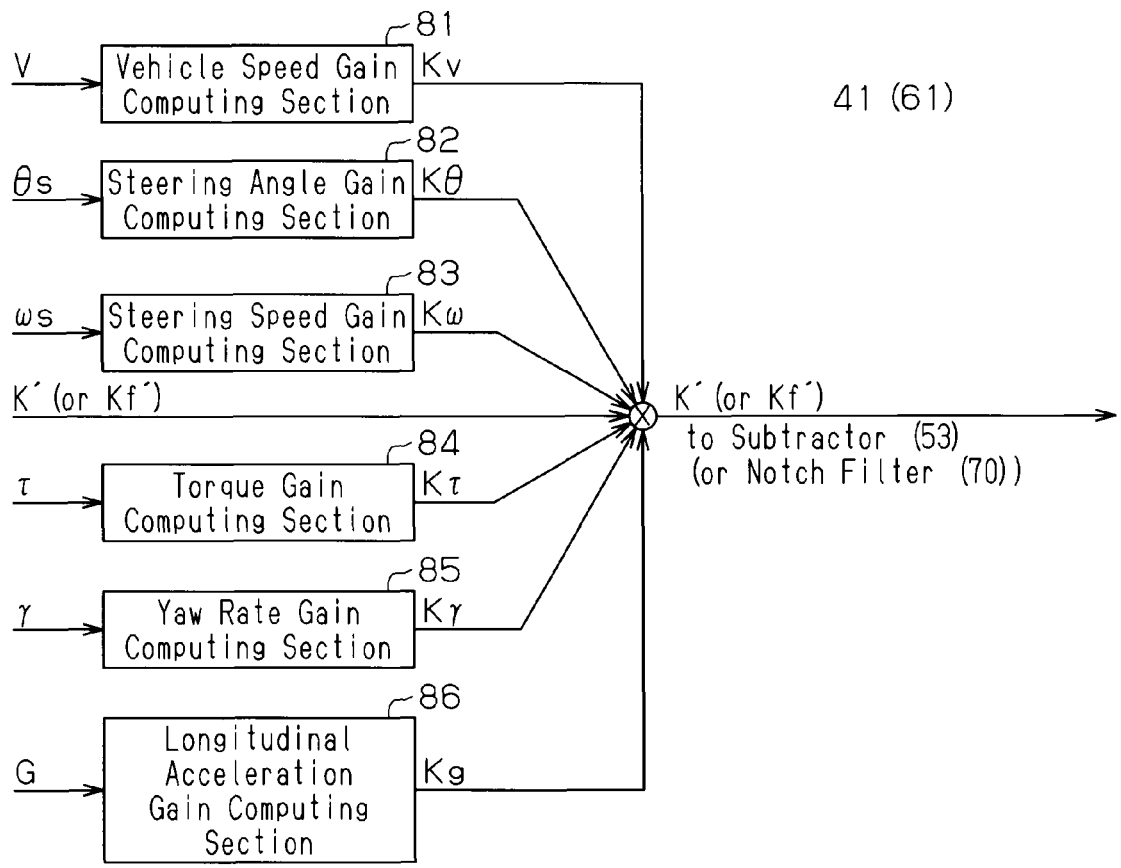
FIG. 9 is a control block diagram of an EPS in accordance with another modified embodiment.
Figure 10:
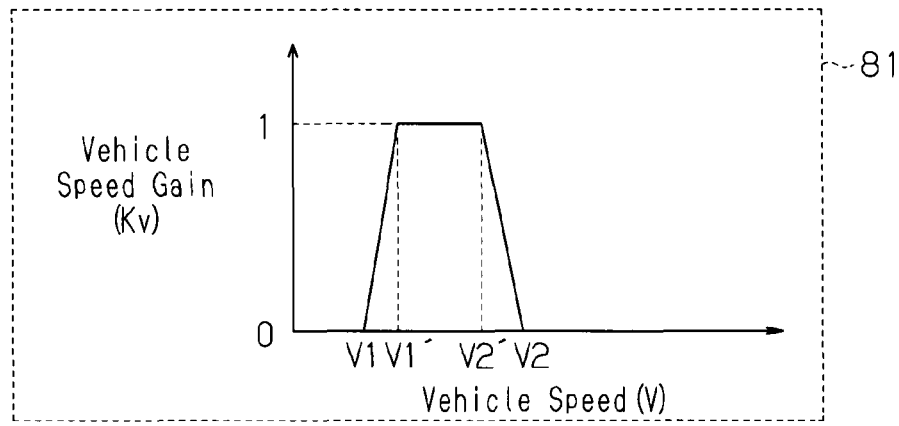
FIG. 10 is a graph showing the relationship between a vehicle speed and a vehicle speed gain.
Figure 11:
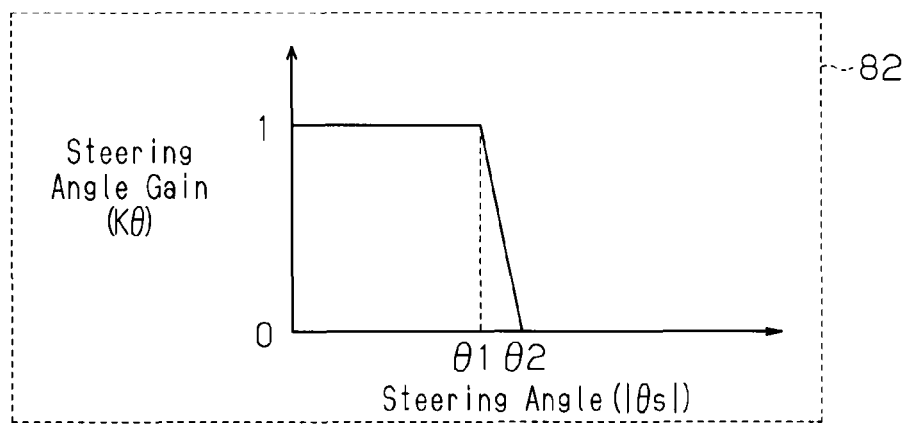
FIG. 11 is a graph showing the relationship between a steering angle and a steering angle gain.
Figure 12:
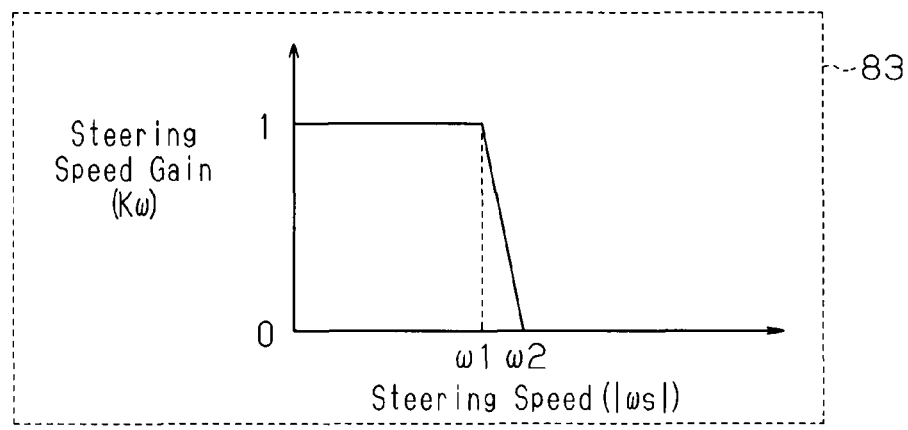
FIG. 12 is a graph showing the relationship between a steering speed and a steering speed gain.
Figure 13:
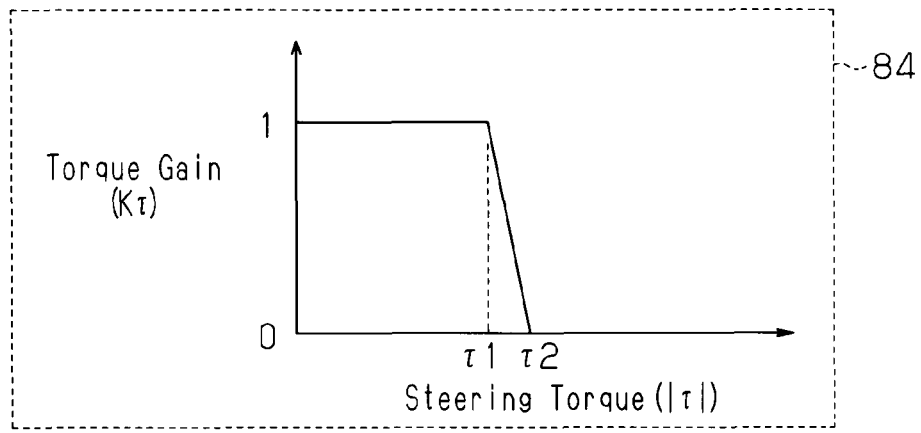
FIG. 13 is a graph showing the relationship between a steering torque and a torque gain.
Figure 14:
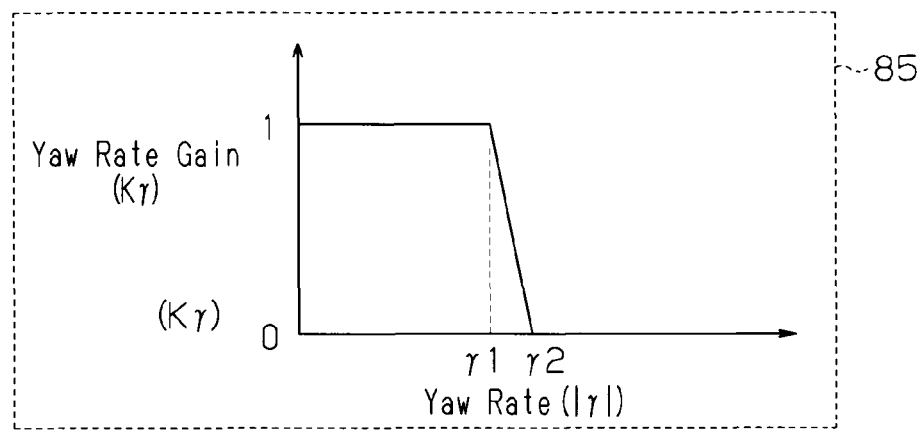
FIG. 14 is a graph showing the relationship between a yaw rate and a yaw rate gain.

More specifically, as shown in FIG. 9, for example, the microcomputer 41 (61) is provided with a vehicle speed gain computing section 81, which computes a vehicle speed gain Kv based on the vehicle speed V. The subtractor 53 (or the notch filter 70) receives a corrected reduction gain K' (or a filter gain Kf') that has been multiplied by the vehicle speed gain Kv. When the vehicle speed V is not in the predetermined vehicle speed range (V>V1 or V<V2), the vehicle speed gain computing section 81 computes the vehicle speed gain Kv as "0" (refer to FIG. 10).

In this example, when the vehicle speed V is equal to or more than the predetermined vehicle speed V1', and equal to or less than the predetermined vehicle speed V2' (V1'≦V≦V2'), the vehicle speed gain Kv is "1". When the vehicle speed V is in a range from the vehicle speed V1 to the vehicle speed V1' (V1≦V<V1'), as the vehicle speed V becomes faster, the vehicle speed gain Kv is increased ("0"→"1"), and when the vehicle speed V is in a range from the vehicle speed V2' to the vehicle speed V2 (V2'<V≦V2), as the vehicle speed V becomes faster, the vehicle speed gain Kv is reduced ("1"→"0").

That is, the amplitude of the vibration that remains in the steering system by applying stress to the steerable wheels 12 depends on the vibration property of suspension, which supports the steerable wheels 12. The vibration is amplified in a predetermined vehicle speed range (V1≦V≦V2) in which the suspension resonates. Also, there is a tendency that the rattling noise caused in the speed reducing mechanism 24 becomes particularly significant in the predetermined vehicle speed range. Conversely, when the vehicle speed V is not in the predetermined vehicle speed range (V>V1 or V<V2), the rattling noise caused in the speed reducing mechanism 24 does not cause a problem. Therefore, in this case, the assist force applied to the steering system is not reduced, and the assist force is reduced only when the vehicle speed V is in the predetermined vehicle speed range (V1≦V≦V2). Accordingly, the rattling noise caused in the speed reducing mechanism 24 is effectively suppressed without deteriorating the steering feel. Also, in the second embodiment, which is provided with the notch filter 70 as the frequency removing means, the same advantages are obtained by limiting the effect of the notch filter 70 to a case where the vehicle speed V is in the predetermined vehicle speed range (V1≦V≦V2).

Furthermore, during steering operation, the assist force is preferably not reduced to suppress generation of the rattling noise in the first embodiment, and the effect of the frequency removing means is preferably reduced in the second embodiment.

More specifically, as shown in FIG. 9, for example, the microcomputer 41 (61) is provided with a steering angle gain computing section 82, which computes a steering angle gain Kθ based on the steering angle θs, a steering speed gain computing section 83, which computes a steering speed gain Kω based on a steering speed ωs, a torque gain computing section 84, which computes a torque gain Kτ based on the steering torque τ, and a yaw rate gain computing section 85, which computes a yaw rate gain Kγ based on a yaw rate γ.

As shown in FIGS. 11 to 14, when the absolute value of the corresponding state quantity is equal to or more than a predetermined threshold value (|θs|≧θ1, |ωs|≧ω1, |τ|≧τ1, ↑γ|≧γ1), the value of the corrected gain (Kθ, Kω, Kτ, Kγ) output from each of the gain computing sections 82 to 85 is set to be less than "1.0". More specifically, when the absolute value of the corresponding state quantity is in a range from each threshold value to a second threshold value θ1<|θs|<θ2, ω1<|ωs|<ω2, τ1<|τ|<τ2, γ1<|γ|<γ2), as the absolute value of each state quantity is increased, the value of the associated correction gain (Kθ, Kω, Kτ, Kγ) is reduced. Also, when the absolute value of the corresponding state quantity is in a range equal to or more than the second threshold value (|θs|≧θ2, |ωs|≧ω2, |τ|≧τ2, |γ|≧γ2), the value of each corrected gain (Kθ, Kω, Kτ, Kγ) is "0".

The subtractor 53 (or the notch filter 70) receives the corrected reduction gain K' (or filter gain Kf') that has been multiplied by the steering angle gain Kθ, the steering speed gain Kω, the torque gain Kτ, and the yaw rate gain Kγ.

Accordingly, in the configuration in which the assist force is reduced as in the first embodiment, when the absolute value of each state quantity is in the range equal to or more than the first threshold value (|θs|≧θ1, |ωs|≧ω1, |τ|>τ1, |γ|≧γ1), the corrected reduction gain K' is smaller than the reduction gain K before correction. When the absolute value of each state quantity is in a range equal to or more than the second threshold value (|θs|≧θ2, |ωs|≧ω2, |τ|≧τ2, |γ|≧γ2), the corrected reduction gain K' is "0". That is, the assist force is not reduced.

Similarly, in the configuration provided with the frequency removing means as in the second embodiment, in a range in which the absolute value of each state quantity is equal to or more than the first threshold value (|θs|≧θ1, |ωs|≧ω1, |τ|≧τ1, |γ|≧γ1), the corrected filter gain Kf' becomes smaller than the filter gain Kf' before correction. That is, the effect of the notch filter 70 serving as the frequency removing means is reduced. In a range in which the absolute value of each state quantity is equal to or more than the second threshold value (|θs|≧θ2, |ωs|≧ω2, |τ|≧τ2, |γ|≧γ2), the corrected filter gain Kf' becomes "0", and the effect of the notch filter 70 becomes invalid.

That is, when the driver performs steering operation, it is desirable to take priority in assisting the steering operation than suppressing the rattling noise. By taking priority in assisting steering operation as described above, the rattling noise generated in the speed reducing mechanism is effectively suppressed without deteriorating the steering feel.

The threshold values in the above examples are desirably optimized separately in the configuration in which the assist force is reduced as in the first embodiment and in the configuration in which the frequency removing means is provided as in the second embodiment.

Also, in the above examples, the estimation of whether the steering operation is being performed (computation of the correction gains) is executed based on the steering angle θs, the steering speed ωs, the steering torque τ, and the yaw rate γ, but may be performed based on the combination of any of the state quantities. Further, state quantities other than the above mentioned state quantities may be employed.

Furthermore, when the vehicle is under braking, it is preferable not to reduce the assist force to suppress generation of the rattling noise in the first embodiment, and it is preferable to reduce the effect of the frequency removing means in the second embodiment.

Figure 15:
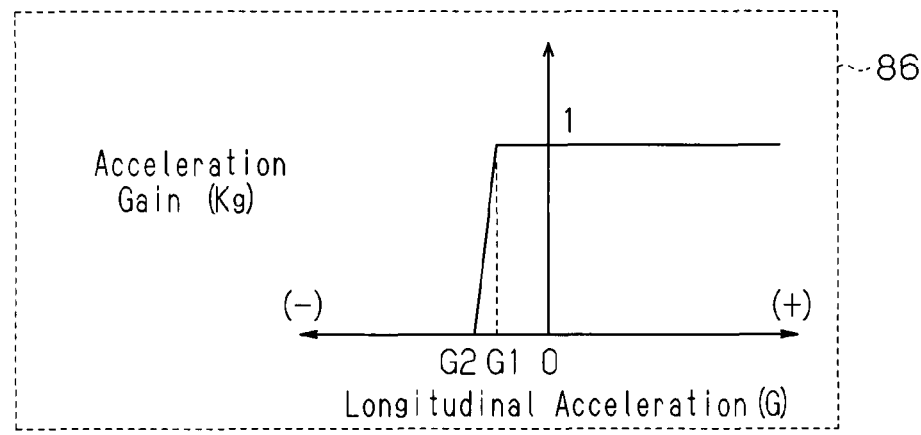
FIG. 15 is a graph showing the relationship between a longitudinal acceleration and an acceleration gain.
Figure 16:
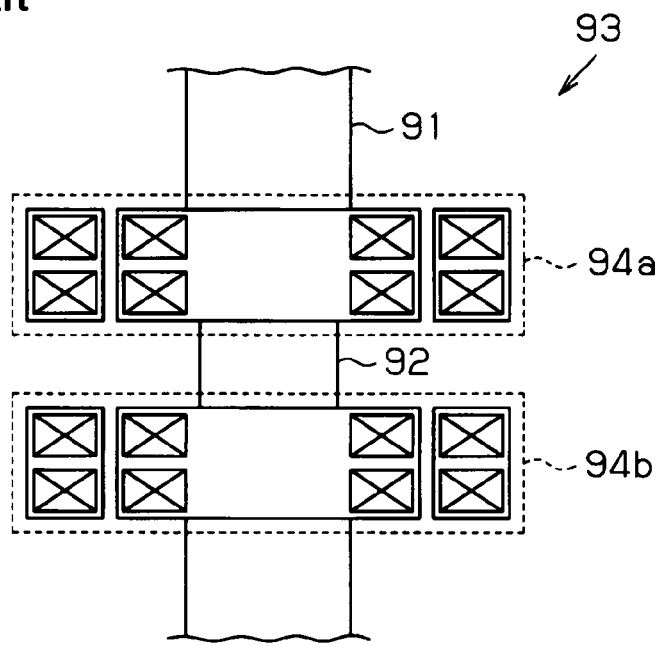
FIG. 16 is a diagrammatic view showing the configuration of a conventional torque sensor.

More specifically, as shown in FIG. 9, for example, the microcomputer 41 (61) may be provided with a longitudinal acceleration gain computing section 86, which computes an acceleration gain Kg based on a longitudinal acceleration G. As shown in FIG. 15, when the longitudinal acceleration G is a negative value equal to or less than a predetermined threshold value G1, the acceleration gain computing section 86 computes a value less than "1.0" as the acceleration gain Kg. More specifically, in a range in which the longitudinal acceleration G is equal to and more than the first threshold value G1 and less than a second threshold value G2 (G2<G≦G1), the acceleration gain Kg is reduced as the longitudinal acceleration G becomes smaller, and when the longitudinal acceleration G is in a range equal to or less than the second threshold value G2 (G≦G2), the acceleration gain Kg is computed to be "0". The subtractor 53 (or the notch filter 70) receives the corrected reduction gain K' (or the filter gain Kf') that has been multiplied by the acceleration gain Kg.

Thus, in the configuration in which the assist force is reduced as in the first embodiment, when the longitudinal acceleration G is in a range equal to or less than the first threshold value G1 (range having a great negative value), the corrected reduction gain K' becomes smaller than the reduction gain K before correction. Also, in a range in which the longitudinal acceleration G is equal to or less than the second threshold value G2 (range having a great negative value), the corrected reduction gain K' becomes "0", and the assist force is not reduced.

Likewise, in the configuration provided with the frequency removing means as in the second embodiment, in a range in which the longitudinal acceleration G is equal to or less than the first threshold value G1 (range having a great negative value), the corrected filter gain Kf' becomes smaller than the filter gain Kf' before correction, and the effect of the notch filter 70 is reduced. Also, in a range in which the longitudinal acceleration G is equal to or less than the second threshold value G2 (range having a great negative value), the corrected filter gain Kf' becomes "0", and the effect of the notch filter 70 becomes invalid.

That is, when the vehicle is under braking, the invention also copes with the vibration transmitted to the steering system accompanying the braking by taking priority in applying the assist force to the steering system. As a result, the rattling noise generated in the speed reducing mechanism is effectively suppressed without deteriorating the steering feel.

The first and second threshold values G1, G2 are preferably optimized separately in the configuration in which the assist force is reduced as in the first embodiment and in the configuration provided with the frequency removing means as in the second embodiment.

Further, in the above examples, estimation of whether the vehicle is under braking (computation of the acceleration gain Kg) is based on the longitudinal acceleration G, however, whether the braking operation is performed may be estimated more directly based on a brake signal.

The invention claimed is:

1. An electric power steering apparatus applied to a steering system that transmits a steering operation of a driver to a steerable wheel, the electric power steering apparatus comprising:
    a steering force assist device provided with a motor as a driving source, the steering force assist device applying an assist force for assisting the steering operation to the steering system by rotating a steering shaft that couples a steering wheel operated by the driver to the steerable wheel using the motor;
    control means for controlling an actuation of the steering force assist device by feeding a driving power to the motor;
    a speed reducing mechanism provided with first and second gears meshed with each other; and
    frequency extracting means for extracting, from a signal indicating a state of the steering system, a frequency component corresponding to a vibration that increases rattling noise generated at the meshed part of the first and second gears,
    wherein the motor is drivingly coupled to the steering shaft via the speed reducing mechanism,
    the control means controls the actuation of the steering force assist device to suppress rattling noise generated in a meshed part of the first and second gears based on a frequency analysis of a vibration generated in the steering system, and
    when an effective value of the extracted frequency component is equal to or more than a predetermined threshold value, the control means reduces the assist force applied to the steering system.

2. The electric power steering apparatus according to claim 1,
    wherein the greater the effective value, the greater the amount by which the control means reduces the assist force becomes.

3. The electric power steering apparatus according to claim 1,
    wherein the control means reduces the assist force applied to the steering system to zero.

4. The electric power steering apparatus according to claim 1,
    wherein the control means reduces the assist force only when vehicle speed is in a predetermined vehicle speed range.

5. The electric power steering apparatus according to claim 1,
    wherein the control means maintains the assist force when a vehicle is under braking.

6. The electric power steering apparatus according to claim 1,
    wherein the control means maintains the assist force during a steering operation.

7. The electric power steering apparatus according to claim 1,
    wherein the control means includes frequency extracting means for extracting, from a signal indicating the state of the steering system, a frequency component corresponding to a vibration that increases rattling noise generated at the meshed part of the first and second gears, and
    wherein the control means controls the assist force applied to the steering system based on the signal indicating the state of the steering system.

8. The electric power steering apparatus according to claim 7, further comprising:
    frequency extracting means for extracting, from a signal indicating the state of the steering system, a frequency component corresponding to a vibration that increases a rattling noise generated at the meshed part of the first and second gears,
    wherein, when the effective value of the extracted frequency component is equal to or less than a predetermined threshold value, the control means reduces the effect of the frequency extracting means.

9. The electric power steering apparatus according to claim 7,
    wherein the control means makes the frequency extracting means effective only when vehicle speed is in a predetermined vehicle speed range.

10. The electric power steering apparatus according to claim 7,
    wherein the control means reduces the effect of the frequency extracting means when a vehicle is under braking.

11. The electric power steering apparatus according to claim 7,
    wherein the control means reduces the effect of the frequency extracting means during a steering operation.

12. The electric power steering apparatus according to claim 1,
wherein the control means maintains the assist force when the absolute value of a steering angle is equal to or more than a predetermined threshold value.

13. The electric power steering apparatus according to claim 1,
wherein the control means maintains the assist force when the absolute value of a steering speed is equal to or more than a predetermined threshold value.

14. The electric power steering apparatus according to claim 1,
wherein the control means maintains the assist force when the absolute value of a steering torque is equal to or more than a predetermined threshold value.

15. The electric power steering apparatus according to claim 1,
wherein the control means maintains the assist force when the absolute value of a yaw rate of a vehicle is equal to or more than a predetermined threshold value.

16. The electric power steering apparatus according to claim 7,
wherein the control means reduces the effect of the frequency extracting means when the absolute value of a steering angle is equal to or more than a predetermined threshold value.

17. The electric power steering apparatus according to claim 7,
wherein the control means reduces the effect of the frequency extracting means when the absolute value of a steering speed is equal to or more than a predetermined threshold value.

18. The electric power steering apparatus according to claim 7,
wherein the control means reduces the effect of the frequency extracting means when the absolute value of a steering torque is equal to or more than a predetermined threshold value.

19. The electric power steering apparatus according to claim 7,
wherein the control means reduces the effect of the frequency extracting means when the absolute value of a yaw rate is equal to or more than a predetermined threshold value.

* * * * *